(12) United States Patent
Eckhart

(10) Patent No.: US 7,912,451 B2
(45) Date of Patent: Mar. 22, 2011

(54) LIMITING USE OF ELECTRONIC EQUIPMENT FEATURES BASED ON LOCATION

(75) Inventor: Colin J. Eckhart, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1060 days.

(21) Appl. No.: 11/678,849

(22) Filed: Feb. 26, 2007

(65) Prior Publication Data

US 2008/0207165 A1 Aug. 28, 2008

(51) Int. Cl.
*H04M 3/16* (2006.01)
*H04M 1/663* (2006.01)
*G06F 15/16* (2006.01)

(52) U.S. Cl. ........... 455/410; 455/414.2; 709/203

(58) Field of Classification Search ............ 709/203, 709/229; 713/176; 455/414.1, 410; 370/352; 700/86; 715/716
See application file for complete search history.

(56) References Cited

U.S. PATENT DOCUMENTS

| | | | | |
|---|---|---|---|---|
| 2004/0249962 | A1* | 12/2004 | Lecomte | 709/229 |
| 2005/0041648 | A1* | 2/2005 | Bharatia et al. | 370/352 |
| 2005/0181808 | A1 | 8/2005 | Vaudreuil | |
| 2006/0028558 | A1 | 2/2006 | Sato et al. | |
| 2006/0143461 | A1* | 6/2006 | Park | 713/176 |
| 2006/0184609 | A1* | 8/2006 | Deng | 709/203 |
| 2007/0060109 | A1* | 3/2007 | Ramer et al. | 455/414.1 |

FOREIGN PATENT DOCUMENTS

WO 2007/015127 2/2007

OTHER PUBLICATIONS

International Search Report and Written Opinion for International Application No. PCT/US2007/077605 dated Apr. 16, 2008.
International Preliminary Report on Patentability for International Application No. PCT/US2007/077605 dated Jun. 8, 2009.

* cited by examiner

*Primary Examiner* — Charles N Appiah
*Assistant Examiner* — Kiet Doan
(74) *Attorney, Agent, or Firm* — Renner, Otto, Boisselle & Sklar, LLP

(57) ABSTRACT

A method and apparatus for limiting the use of one or more features and/or applications provided in electronic equipment based on identification information and location information associated with the electronic equipment is disclosed. Upon initiation of an application and/or feature, a request is made to a remote server. The request includes identification information and location information associated with a geographical location of the electronic equipment. A database maintained at the remote server determines whether the user has the necessary privileges to activate the application and/or feature and whether any limits (e.g., digital rights management) should be placed on the content created from the application and/or feature.

18 Claims, 3 Drawing Sheets

| Identity Information 80 | Location Information 82 | Application/ Feature 84 | DRM 86 | Agreement 88 |
|---|---|---|---|---|
| 35-209900-176148-1-23 | 40° 47' N 73° 58' W 0' | Photos | Originating Equipment | NDA |
| 35-209900-176148-1-23 | 40° 47' N 73° 58' W 0' | Audio | User Equipment | NDA |
| 37-304022-198067-2-91 | 41° 24' N 81° 51' W, 100' | All | No Rights | No |
| * | * | * | * | * |
| * | * | * | * | * |
| 38-599910-625569-5-19 | www.company.com | * | * | * |
| 39-4034111-568999-3-07 | 35° 13' N 80° 56' W, 0' | Photos | Facility | NDA |

LIMITING USE OF ELECTRONIC EQUIPMENT FEATURES BASED ON LOCATION

TECHNICAL FIELD OF THE INVENTION

The present invention relates to a method and apparatus for limiting the use of applications and/or features associated with electronic equipment based on location of the electronic equipment and corporate service level agreements.

DESCRIPTION OF THE RELATED ART

Mobile and/or wireless electronic equipment are becoming increasingly popular. For example, portable communication devices, mobile telephones, portable media players and portable gaming devices are now in wide-spread use. In addition, the applications and/or features associated with certain types of electronic equipment have become increasingly diverse. To name a few examples, many electronic devices have cameras, text messaging capability, Internet browsing capability, electronic mail capability, video playback capability, audio playback capability, image display capability and hands-free headset interfaces.

Users of electronic equipment, such as, for example, communication devices, mobile phones, personal digital assistants, etc., are increasingly transmitting multimedia content in the form of images, for example, to others. The multimedia content may be image files taken by photographic equipment (e.g., cameras, digital video recorders, etc.) housed within the users portable electronic equipment, and/or image files forwarded from other users.

Due to privacy concerns, many establishments (e.g., corporations, health clubs, entertainment establishments, etc.) totally ban the use of portable electronic equipment equipped with photographic equipment in their facilities and/or specific locations within their facility. For example, many corporations require visitors to surrender their portable electronic equipment devices upon entering their facility. While this prevents unauthorized distribution of images and/or other multimedia content, it also leaves the visitor unable to communicate with others by using his or her portable electronic equipment while visiting the company. In addition, there are some instances where if the digital rights of an image could be controlled and limited by non-disclosure or other legal agreements, the use of photographic equipment could be beneficial to the establishment.

SUMMARY

In view of the aforementioned shortcomings associated with enforcement of existing privacy policy regarding the user of photographic equipment or portable electronic equipment, in general, there is a need in the art for limiting access to one or more applications and/or features of the electronic equipment based on the identity and the location of the electronic equipment.

According to one aspect of the invention, a method for limiting the use of one or more multimedia applications of an electronic equipment, the method comprising: providing an electronic equipment having one or more multimedia applications that are adapted to be initiated by an associated user's action; transmitting a request to a remote server upon initiation of the one or more multimedia applications, wherein the request includes identification information associated with the electronic equipment and location information associated with a geographical location of the electronic equipment; receiving access information from the remote server, wherein the access information is based at least in part on the request transmitted to the remote server; and granting access to the one or more multimedia applications on the electronic equipment based at least in part on the access information received from the remote server.

According to another aspect, the multimedia application is photographic equipment housed within the electronic equipment for taking a picture and/or a video.

According to another aspect, the multimedia application is an audio recorder housed within the electronic equipment for recording audio.

According to another aspect, the identification information is a telephone number associated with the electronic equipment.

According to another aspect, the identification information is an international mobile equipment identity associated with the electronic equipment.

According to another aspect, the location information is based on one or more signals received from a global positioning system.

According to another aspect, the location information is based on one or more signals received from a presence server.

According to another aspect, the remote server includes a database having one or more permission entries associated with the identity information and/or the location information for the one or more multimedia applications available on the electronic equipment.

According to another aspect, the database further includes at least one digital rights entry associated for the one or more multimedia applications available on the electronic equipment.

According to another aspect, a multimedia content file generated by the one or more multimedia applications initiated by the user includes the at least one digital rights entry embedded in a portion of the multimedia content file.

According to another aspect, the remote server includes a link to a corporate server having a corporate database, wherein the corporate database has one or more permission entries associated with the identity information and/or the location information for the one or more multimedia applications available on the electronic equipment.

According to another aspect, the corporate database further includes at least one digital rights entry associated for the one or more multimedia applications available on the electronic equipment.

According to another aspect, a multimedia content file generated by the one or more multimedia applications initiated by the user includes the at least one digital rights entry embedded in a portion of the multimedia content file.

An aspect of the invention relates to an electronic equipment comprising: a memory; an input device for initiating at least one multimedia application housed within the electronic equipment; a processor that executes an application program within the memory, the application program when executed causing the electronic equipment to: transmit a request to a remote server upon initiation of one or more multimedia applications, wherein the request includes identification information associated with the electronic equipment and location information associated with a current geographical location associated with the electronic equipment; receive access information from the remote server, wherein the access information is based at least in part on the request transmitted to the remote server; and grant access to the one or more multimedia applications of the electronic equipment based at least in part on the access information received from the remote server.

According to another aspect, the multimedia application is photographic equipment housed within the electronic equipment for taking a picture and/or a video.

According to another aspect, the multimedia application is an audio recorder housed within the electronic equipment for recording audio.

According to another aspect, the identification information is an international mobile equipment identity associated with the electronic equipment.

According to another aspect, the location information is based on one or more signals received from a global positioning system.

According to another aspect, the remote server includes a database having one or more permission entries associated with the identity information and/or the location information for the one or more multimedia applications available on the electronic equipment.

According to another aspect, the database further includes at least one digital rights entry associated for the one or more multimedia applications available on the electronic equipment.

According to another aspect, a multimedia content file generated by the one or more multimedia applications initiated by the user includes the at least one digital rights entry embedded in a portion of the multimedia content file.

According to another aspect, if the access information includes an indication that access to the application is prohibited, a signal is transmitted to the processor to terminate the application.

An aspect of the invention relates to a method for limiting the use of one or more multimedia applications of an electronic equipment, the method comprising: receiving a request upon initiation of a multimedia application from an electronic equipment, wherein the request includes identification information associated with the electronic equipment and location information associated with a geographical location of the electronic equipment; querying a database stored remotely from the electronic equipment based at least in part on the request to determine a user's access rights for the multimedia application; and transmitting access information to the electronic equipment based at least in part on the access information stored in the database.

According to another aspect, a computer program stored on a machine readable medium, the program being suitable for use in an electronic equipment as a privacy rights manager, wherein: when the program is loaded in memory in the electronic equipment and executed causes the electronic equipment to transmit a request upon initiation of a multimedia application to a remote server, wherein the request includes identification information associated with the electronic equipment and location information associated with a current geographical location associated with the electronic equipment; receive access information from the remote server, wherein the access information is based at least in part on the request; and grant access to the multimedia application of the electronic equipment based at least in part on the access information received from the remote server.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

It should be emphasized that the term "comprise/comprising" when used in this specification is taken to specify the presence of stated features, integers, steps or components but does not preclude the presence or addition of one or more other features, integers, steps, components or groups thereof."

The term "electronic equipment" includes portable radio communication equipment. The term "portable radio communication equipment", which herein after is referred to as a mobile radio terminal, includes all equipment such as mobile telephones, pagers, communicators, i.e., electronic organizers, personal digital assistants (PDA's), portable communication apparatus, smart phones or the like.

BRIEF DESCRIPTION OF THE DRAWINGS

The foregoing and other embodiments of the invention are hereinafter discussed with reference to the drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

Aspects of the present invention relate to a method and apparatus for limiting the use of one or more features and/or applications provided in electronic equipment based on identification information and location information associated with the electronic equipment. Upon initiation of a application and/or feature, a request is made to a remote server. The request generally includes identification information associated with the electronic equipment and location information associated with a geographical location of the electronic equipment. A database maintained at the remote server or at a corporate server determines whether the user has the necessary privileges to activate the application and/or feature and whether any limits (e.g., digital rights management) should be placed on the content created from the application and/or feature. Aspects of the invention are described primarily in the context of a mobile telephone. However, it will be appreciated that the invention is not intended to relate solely to a mobile telephone and can relate to any type of electronic equipment.

The term "feature" may be used interchangeably with the "application" in the context of this application and vice versa. In addition, the terms "feature" and "application" may include features or applications that are implemented in hardware, software and/or a combination of hardware and software.

Figure 1:
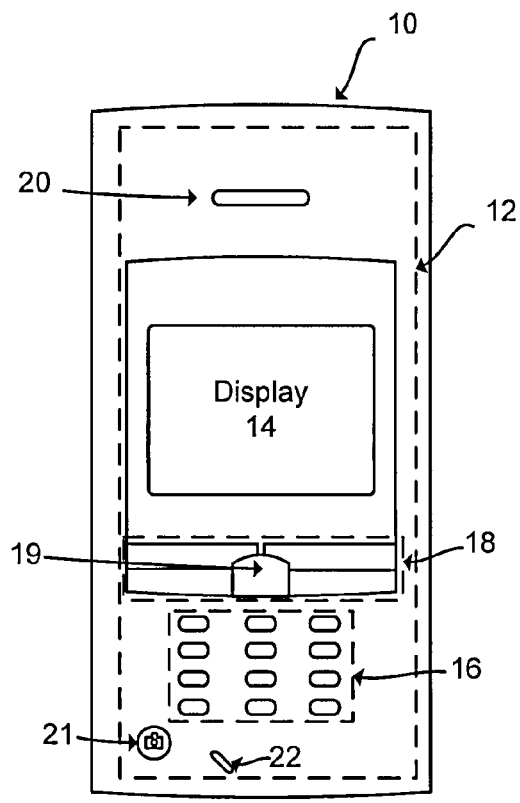
FIGS. 1 and 2 are exemplary schematic diagrams illustrating an electronic equipment in accordance with aspects of the present invention.

Referring to FIG. 1, an electronic equipment 10 is shown in accordance with aspects of the present invention. The illustrated electronic equipment 10 in the exemplary embodiment is a mobile telephone and may be referred to interchangeably as a mobile telephone and/or electronic equipment. The electronic equipment 10 is shown as having a "brick" or "block" design type housing 11, but it will be appreciated that other type housings, such as a clamshell housing or a slide-type housing, may be utilized without departing from the scope of the invention.

As illustrated in FIG. 1, the electronic equipment 10 may include a user interface 12 that enables the user easily and efficiently to perform one or more communication tasks (e.g., enter a telephone number, identify a contact, select a contact, make a telephone call, receive a telephone call, look up a telephone number, enter a text message, receive text message, initiate a application and/or feature, etc). The user interface 12 of the electronic equipment 10 generally includes one or more of the following components: a display 14, an alphanumeric keypad 16, function keys 18, a navigation tool 19, a speaker 20, an application key 21 and a microphone 22.

The display 14 presents information to a user such as operating state, time, telephone numbers, contact information, various navigational menus, user information, available services and/or products, etc., which generally enable the user to utilize the various features and/or applications of the electronic equipment 10. The display 14 may also be used to visually display content accessible by the electronic equipment 10 from one or more remote sources (e.g., a personal computer, a server, a media server, a content server, an electronic storage medium, a global positioning system, a corporate server, etc.). The displayed content may include audio and/or video presentations stored locally in memory 24 (FIG. 2) of the electronic equipment 10 and/or stored remotely from the electronic equipment 10 (e.g., on a remote storage device, a media server, remote personal computer, corporate server, etc.).

Such presentations may be derived, for example, from multimedia files, including audio and/or video files, from a received mobile radio and/or television signal, etc. In many situations, the video presentations are accompanied by audio presentations. For example, the displayed video component may be a "music video" and the corresponding audio component may be music intended to be synchronized with the video component. As another example, the displayed video component may correspond to a received mobile television signal and the corresponding audio component may be speech and/or music intended to be synchronized with the video component. The audio component may be broadcast to the user with a speaker 20 of the electronic equipment 10. Alternatively, the audio component may be broadcast to the user wirelessly through a headset (not shown).

The electronic equipment 10 further includes an alphanumeric keypad 16 that provides for a variety of user input operations. For example, the keypad 16 may include alphanumeric keys for allowing entry of alphanumeric information such as telephone numbers, phone lists, contact information, notes, etc. In addition, the electronic equipment 10 may include special function keys 18 such as, for example, a "call send" key for initiating or answering a call, and a "call end" key for ending, or "hanging up" a call, a volume key, audio mute key, on/off key, etc. The electronic equipment 10 may also include a navigation tool 19, for example, for navigating through a menu displayed on the display 14 to select different telephone functions and/or applications, profiles, services, products, settings, etc., as is conventional. The electronic equipment 10 may also include one or more application keys, for example, a camera key 21, an e-mail application key, a web browser key, etc. Generally, when the application keys are depressed by an associated user, the application is initiated and application begins to run on the electronic equipment 10. As one of ordinary skill in the art will appreciate keys or key-like functionality may also be embodied as a touch screen associated with the display 14.

Figure 2:
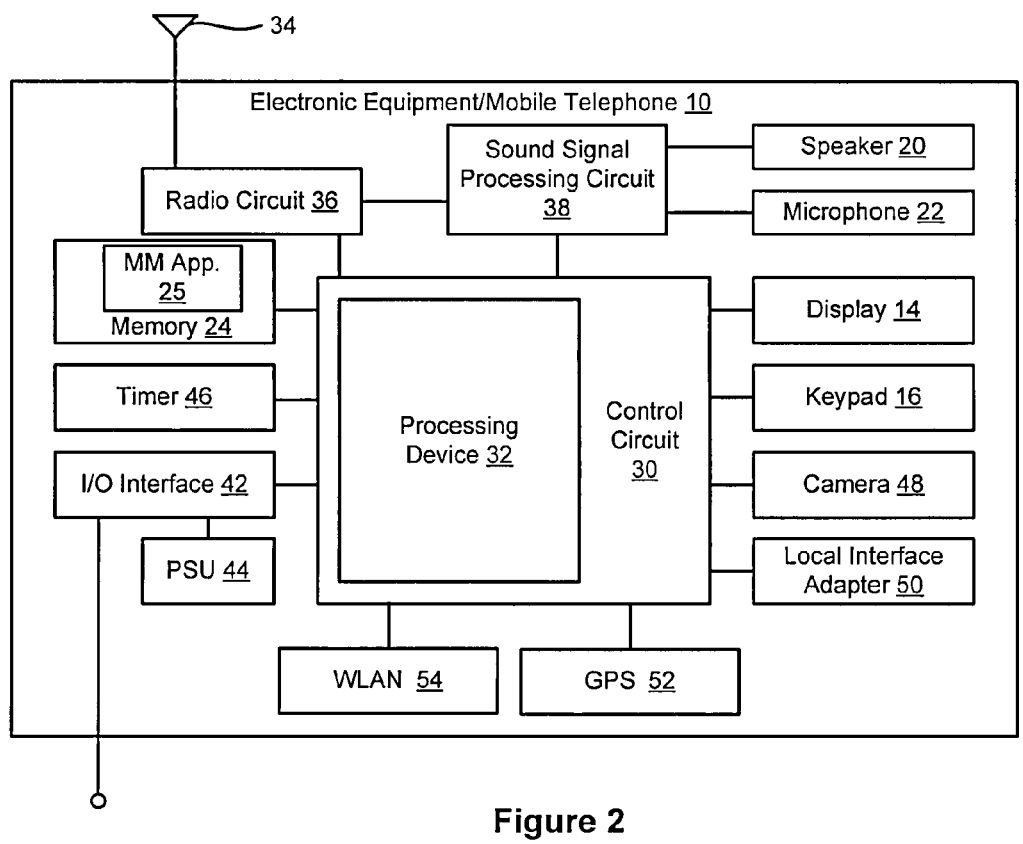

Referring to FIG. 2, a functional block diagram of the electronic equipment 10 is illustrated. The electronic equipment 10 includes a primary control circuit 30 that is configured to carry out overall control of the functions and operations of the electronic equipment 10. The control circuit 30 may include a processing device 32, such as a CPU, microcontroller or microprocessor. The processing device 32 executes code stored in a memory (not shown) within the control circuit 30 and/or in a separate memory, such as memory 24, in order to carry out operation of the electronic equipment 10.

The memory 24 may be, for example, a buffer, a flash memory, a hard drive, a removable media, a volatile memory and/or a non-volatile memory. The memory 24 is operable to store any desired information, including for example, user information, network based content, applications, etc. Memory 24 may also store multimedia application software 25 (e.g., multimedia applications, recording application, camera application, video recording application, audio recording application, etc.). The multimedia application software 25 is generally coupled to a processing device 32 through control circuit 30. The processing device 32 is programmed to perform the functionality described herein, for example, loading a multimedia application, transmitting and/or receiving information from a remote server, terminating applications not authorized to be accessed, etc.

As explained below, upon initiation of an application (e.g., a multimedia application 25), the processing device 32 executes code to carry out various functions of the electronic equipment 10, including sending a request to a remote server. The request generally includes identification information associated with the electronic equipment 10 and location information associated with a geographical location of the electronic equipment 10 when the application is initiated. A database maintained at the remote server and/or at a corporate server determines whether the user has the necessary privileges to activate the application and/or feature and whether any limits (e.g., digital rights management) should be placed on the content created from the application and/or feature. The remote server then transmits access information to the electronic equipment 10. The user is then provided full access, limited access (e.g., digital rights limited) and/or denied access to the application and/or feature based upon the access information. If the user is denied access to the application and/or feature, a signal is transmitted to the processor to terminate the application from the control circuit 30.

The processing device 32 also is coupled with conventional input devices (e.g., alphanumeric keypad 16, function keys 18, navigation tool 19, camera function key 21, microphone 22, etc.) and to the device display 14 and the speaker 20. The user interface 12 facilitates controlling operation of the electronic equipment 10 including initiating and conducting telephone calls and other communications (e.g., SMS communications, Internet communications, etc.), as well as, loading multimedia applications and transmitting and/or receiving information from a remote server.

Continuing to refer to FIGS. 1 and 2, the electronic equipment 10 includes an antenna 34 coupled to a radio circuit 36. The radio circuit 36 includes a radio frequency transmitter and receiver for transmitting and receiving signals via the antenna 34 as is conventional. The electronic equipment 10 further includes a sound signal processing circuit 38 for processing the audio signal transmitted by/received from the radio circuit 36. Coupled to the sound processing circuit 38 are the speaker 20 and a microphone 22 that enable a user to listen and speak via the electronic equipment 10 as is conventional. The radio circuit 36 and sound processing circuit 38 are each coupled to the control circuit 30 so as to carry out overall operation.

The electronic equipment 10 further includes an I/O interface 42. The I/O interface 42 may be in the form of typical mobile telephone I/O interfaces, such as a multi-element connector at the base of the electronic equipment 10. As is typical, the I/O interface 42 may be used to couple the electronic equipment 10 to a battery charger to charge a power supply unit (PSU) 44 within the electronic equipment 10. In addition, or in the alternative, the I/O interface 42 may serve to connect the electronic equipment 10 to a wired personal hands-free adaptor, to a personal computer or other device via a data cable, etc. The electronic equipment 10 may also include a timer 46 for carrying out timing functions. Such functions may include timing the durations of calls, generating the content of time and date stamps, etc.

The electronic equipment 10 may include various built-in applications, such as a camera 48 for taking digital pictures. The camera 48 may be initiated by a user depressing the camera application key 21 (shown in FIG. 1). The electronic equipment 10 also may include a position data receiver 52, such as a global positioning satellite (GPS) receiver, Galileo satellite system receiver or the like.

In to establish wireless communication with other locally positioned devices, such as a headset, another mobile telephone, a computer, etc., the electronic equipment 10 may also include a local wireless interface adapter 50 (e.g., a Bluetooth adaptor). To establish communications with network-based content, the electronic equipment 10 may further include a wireless local area network interface adapter 54. Preferably, the WLAN adapter 54 is compatible with one or more IEEE 802.11 protocols (e.g., 802.11(a), 802.11(b) and/or 802.11 (g), etc.) and allows the electronic equipment 10 to acquire a unique identifier (e.g., MAC and IP addresses) on an associated network and communicate with one or more devices on the network, assuming the user has the appropriate privileges and/or has been properly authenticated.

The electronic equipment 10 may be configured to operate in a wide area communications system. The system can include one or more servers or call control elements for managing calls placed by and destined to the electronic equipment 10, transmitting network-based content (e.g., image files, audio files, video files, services, products, information, etc.) to the electronic equipment 10 and carrying out any other support functions. The server may communicate with the electronic equipment 10 via a network and a transmission medium. The transmission medium may be any appropriate device or assembly, including, for example, a communications tower, another mobile telephone, a wireless access point, a router, a satellite, etc. Portions of the network may include wired and/or wireless transmission pathways.

The electronic equipment 10 includes conventional call circuitry that enables the electronic equipment 10 to establish a call and/or exchange signals with a called/calling device, typically another mobile telephone or landline telephone. However, the called/calling device need not be another telephone, but may be some other device such as an Internet web server, content providing server, etc.

Figures 3, 4:
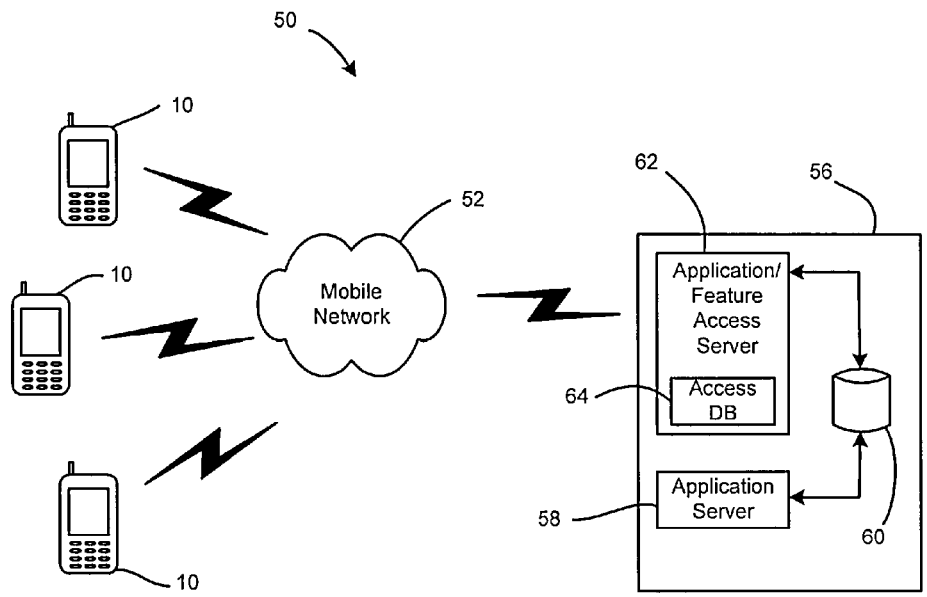
FIG. 3 is an exemplary network in accordance with aspects of the present invention.
FIG. 4 is an exemplary listing of a database in accordance with aspects of the present invention.

Referring to FIG. 3, a communication system 50 in accordance with aspects of the present invention is illustrated. The communication system 50 includes a mobile network 52, such as a mobile cellular telephony network, that facilitates communication, such as voice communication and/or data transfer between a plurality of electronic equipment 10, such as mobile phones, mobile terminals or the like. The communication system 50 includes a network infrastructure 56, portions of which are used or otherwise accessed by the electronic equipment 10 in connection with aspects of the invention. The electronic equipment 10 may interact with each other and/or the network infrastructure 56 in accordance with any suitable communication standard, including, but not limited to, Short Message Service (SMS), Advanced Mobile Phone Service (AMPS), Digital Advanced Mobile Phone Service (D-AMPS), Global System for Mobile Communications (GSM), Code Division Multiple Access (CDMA), wireless local area network (WLAN), Bluetooth or the like. In other words, the communication system 50 is illustrated in FIG. 3 for purposes of explaining aspects of the present invention, without limiting the invention to a particular communication system design, architecture or communication standard.

The network infrastructure 56 includes one or more application servers 58 and a storage device 60, such as a memory or hard disk for storing data accessible or otherwise usable by the application servers. At least one of the application servers 58 is an electronic application and/or feature access server 62 that includes one or more databases 64 that are maintained by a network operator to limit the use of one or more multimedia applications and/or features of an electronic equipment (also referred to as application/feature access service) based on the identification of the electronic equipment and a geographical location of the electronic equipment.

In general operation, the electronic equipment 10 queries database 64 to determine if a user initiated operation (e.g., initiation of an application and/or feature of the electronic equipment 10) is allowed. The query is based on the identity information and location information of the electronic equipment. The network server and/or corporate server returns authorization to the use the application and/or feature or denies access to the application and/or feature. If the user of the electronic equipment desires to create multimedia files (e.g., images, videos, audios, etc.), and has access rights to do so, the electronic equipment 10 also queries the database 64 to determine what digital rights need to be appended to the file (if any). Again, the query is based on the identity information and location information of the electronic equipment.

The database 64 has one or more entries corresponding to each electronic equipment that is a subscriber to the application/feature access service. The database 64 may be structured such that it would have discreet permission entries that limit the use of electronic equipment applications and/or features or a link (e.g., a uniform resource locator, Internet Protocol address, etc.) to a database maintained by an entity that desires to limit or curtail access to applications and/or features of electronic equipment based on the identity of the user (through the identity of the electronic equipment) and the location associated with the electronic equipment.

The criteria used to determine permissions to use certain applications and/or features of the electronic equipment may be such items as: (1) to whom does the electronic equipment belong (e.g., employee, competitor, member of the press, etc.); (2) does the owner of the electronic equipment have a legal agreement such as a non-disclosure agreement that that protects the intellectual property rights of the company; and/or (3) is the electronic equipment being used in an area where it is appropriate for the feature to be used. For example, the company may want to prohibit anyone from taking photographs and/or videos in a creative design and/or research center, even if they have rights to take photographs and/or videos everywhere else in the facility. One of ordinary skill in the art will readily appreciate that the listed criteria are exemplary in nature and a variety of other criteria may be used to determine permissions to use certain applications and/or features of the electronic equipment in a specific location.

The database 64 also includes one or more entries for digital rights management of multimedia content created by electronic equipment in a designated (restricted) geographical location, as determined by the location information transmitted to the database 64. The database 64 may be structured such that it would have discreet digital rights permissions entries that limit the ability of the user of the electronic equipment to transfer, view and/or copy electronic multimedia files taken by a particular electronic equipment at a particular geographic location. The database 64 may also have a link (e.g., a uniform resource locator, Internet Protocol address, etc.) to a database maintained by an entity that desires to limit or curtail access to applications and/or features of electronic equipment based on the identity of the user (through the identity of the electronic equipment) and the location information associated with the electronic equipment.

The database 64 may include information regarding corporate agreements that the company and/or entity has with the individual that owns the electronic equipment. Based on these agreements, the company and/or entity can enforce limits on the use of the generated contents based on such criteria as: (1) restricted viewing location, content can only be rendered within specified geographical boundaries (e.g., the content may only be rendered within the corporation's and/or entity's facilities; (2) content may be restricted to rendering on the user's electronic equipment or other rendering devices owned by that particular user and/or the entity that has a non-disclosure agreement with the company and/or entity; and/or (3) content may only be allowed to be rendered when the rendering device was within a facility owned by the parties to the non-disclosure agreement. One of ordinary skill in the art will readily appreciate that the listed criteria are exemplary in nature and a variety of other criteria may be used to specify digital rights associated with the generated contents.

An exemplary database 64 is illustrated in FIG. 4. The database 64 may include identity information field 80, location information field 82, application and/or feature field 84, digital rights management field 86, and agreement field 88. One of ordinary skill in the art will readily appreciate that the database 64 is exemplary in nature and may include different fields, additional fields, fewer fields, etc. than those illustrated in FIG. 4.

The identity information field 80 includes unique identifier information associated with the electronic equipment 10. Such information may include the International Mobile Equipment Identity (IMEI), which is a 15 or 17 digit number that includes information on the origin, model, and serial number of the device. Another unique identifier may be a telephone number associated with electronic equipment, etc. One of ordinary skill in the art will readily appreciate that a variety of methods that may be used to generate unique identifier information and assign the unique identifier information to a particular electronic equipment. All such methods are within the scope of the present invention. Referring to FIG. 4, the identify information column includes four entries, which are directed to three unique electronic equipment. There are two identical entries (e.g., 35-209900-176148-1-23) that have different access and/or digital rights limitations imposed on separate applications and/or features. Such duplicate entries may be permitted or not permitted based on design criteria and structure of the database 64.

The location information field 82 includes location information that generally corresponds to a geographical location that the user has limited rights to create and/or distribute multimedia content. The location information may be received from any source. The location information may be in the form of global positioning data received from a satellite and/or mobile telephony towers and/or location information received from a presence server. In general, the location information specified in the location information field 82 corresponds to a geographical location that the user of the electronic equipment has no access rights to a particular application and/or feature of the mobile telephone or has limited rights that may be managed by digital rights management. The location information may specify an office, a floor, a facility, etc. for which the electronic equipment is not provided access to a facility and/or only provided limited access. For example, a member of the press visiting a facility may be provided full access to applications and/or features on his or her own electronic equipment while in a corporate pressroom, but may be provided with no and/or limited rights to create multimedia content in other portions of the facility. As shown in FIG. 4, the location information field 82 is shown populated with latitude, longitude and altitude parameters listed. There may also be a default radius (e.g., 0.5 miles) from the location information in which the rights specified in the database 62 will prevail. In another embodiment, a link to a private database may be provided (as shown in FIG. 4). The link to the private database may be maintained by a company or other entity on behalf of the company. As one of ordinary skill in the art will appreciate, the more flexibility that is given to assigning access based on location, the more location parameters will need to be specified, including a mechanism determine whether the electronic equipment is within a defined geographical boundary defined by specific geographic points.

The application/feature field 84 identifies the applications and/or features of the electronic equipment that the user may be prevented from using. Such applications and/or features are generally multimedia applications and/or features. For example, taking pictures and/or videos, recording audio, etc. In some instances, it may even be preferable to prevent the user from making and/or receiving telephone calls through the electronic equipment 10. As shown in FIG. 4, the application/feature field 84 may be populated with application and/or features in which limitations are placed on the electronic equipment based on the identity and location of the electronic equipment. For example, the user may be prohibited from generating photos, videos, audio, access to all applications and/or features, etc. One of ordinary skill in the art will readily appreciate the application and/or feature in which access may be controlled will vary depending upon a variety of factors.

The digital rights management field 86 includes the digital rights that are appended to any multimedia content created by the electronic equipment at the specified location. Such information may be, for example, the content may only be viewed on the particular electronic equipment, viewed only on equipment owned by a particular individual and/or company, the content may only be displayed in certain geographical locations (e.g., within the facility of the company where the content was created, etc. Such digital rights are generally appended to a header of the associated multimedia file. As shown in FIG. 4, the digital rights management field 86 is populated with entries for displaying only on the electronic equipment, equipment owned by a particular user and in a particular facility. One of ordinary skill in the art will readily appreciate that a variety of other digital rights management restrictions may be imposed.

The agreement field 88 identifies whether an agreement exists between the owner of the electronic equipment and the company in which the owner is visiting and/or the network operator. The agreement field 88 may identify the existence of the agreement, the type of agreement and/or any other term of the agreement deemed relevant by the company and/or operator. As shown in FIG. 4, the agreement field 88 identifies the existence of a particular agreement and the type of the agreement (e.g., confidentiality agreement, non-disclosure agreement (NDA), etc.).

Figure 5:
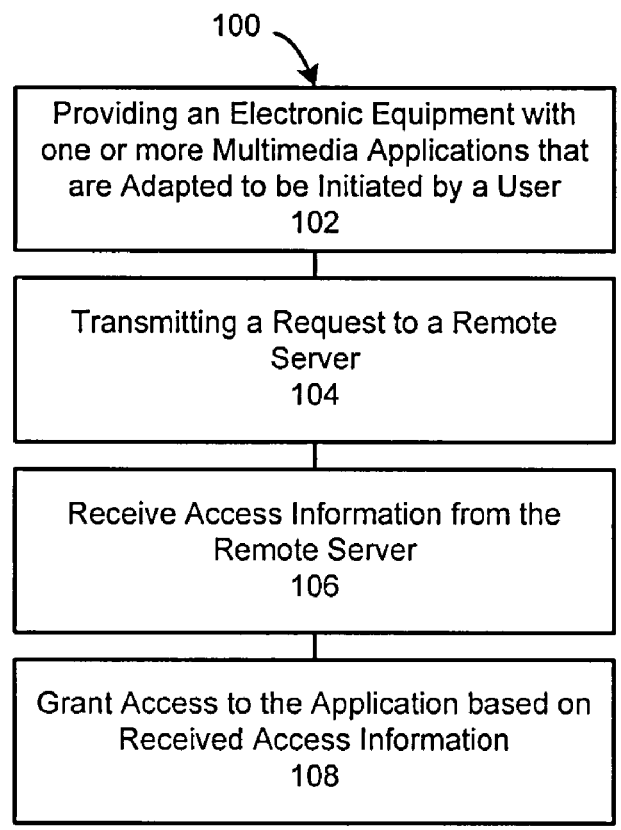
FIGS. 5 and 6 are exemplary methods in accordance with aspects of the present invention.

An exemplary method 100 for limiting the use of one or more multimedia applications of an electronic equipment in accordance with aspects of the invention is illustrated in FIG. 5. At step 102, an electronic equipment having one or more multimedia applications that are adapted to be initiated by an associated user's action is provided to an associated user for use. At step 104, upon initiation of one or more multimedia applications, a request is transmitted to a remote server. The request includes identification information associated with the electronic equipment and location information associated with a geographical location of the electronic equipment. At step 106 access information is received from the remote server. The access information is based at least in part on the request transmitted to the remote server. At step 108, access to the one or more multimedia applications on the electronic equipment is granted based at least in part on the access information received from the remote server.

Figure 6:
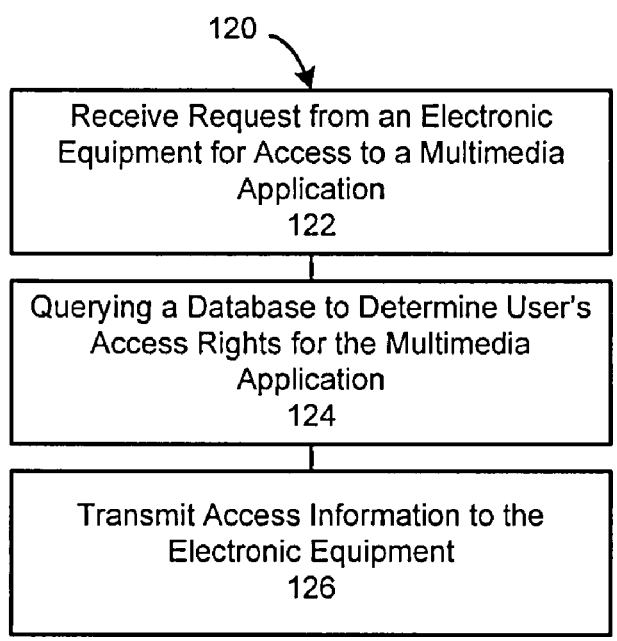

Another exemplary method 120 for limiting the use of one or more multimedia applications of an electronic equipment in accordance with aspects of the invention are illustrated in FIG. 6. At step 122, a request caused to be initiated by initiation of a multimedia application is received from an electronic equipment. The request includes identification information associated with the electronic equipment and location information associated with a geographical location of the electronic equipment. At step 124, a database stored remotely from the electronic equipment is queried based at least in part on information contained in the request to determine a user's access rights for the multimedia application. At step 126, access information is transmitted to the electronic equipment based at least in part on the access information stored in the database.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". It should also be noted that although the specification lists method steps occurring in a particular order, these steps may be executed in any order, or at the same time.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

What is claimed is:

1. A method for limiting the use of one or more multimedia applications of an electronic equipment, the method comprising:

transmitting a request from an electronic equipment having one or more multimedia applications that are adapted to be initiated by an associated user's action to a remote server upon initiation of the one or more multimedia applications, wherein the request includes identification information associated with the electronic equipment, wherein the remote server includes a database having one or more permission entries associated with the identity information and/or the location information for the one or more multimedia applications available on the electronic equipment, wherein the database further includes at least one digital rights entry associated with the one or more multimedia applications available on the electronic equipment, receiving access information from the remote server, wherein the access information is based at least in part on the request transmitted to the remote server and the access information includes location information in which the electronic equipment has limited rights to create and/or distribute multimedia content; and processing the access information to determine whether the one or more multimedia applications that have been initiated are accessible based at least in part on the received access information and wherein a multimedia content file generated by the one or more multimedia applications initiated by the user includes the at least one digital rights entry embedded in a portion of the multimedia content file.

2. The method according to claim 1, wherein the multimedia application is photographic equipment housed within the electronic equipment for taking a picture and/or a video.

3. The method according to claim 1, wherein the multimedia application is an audio recorder housed within the electronic equipment for recording audio.

4. The method according to claim 1, wherein identification information is a telephone number associated with the electronic equipment.

5. The method according to claim 1, wherein the identification information is an international mobile equipment identity associated with the electronic equipment.

6. The method according to claim 5, wherein the location information is based on one or more signals received from a global positioning system.

7. The method according to claim 6, wherein the location information is based on one or more signals received from a presence server.

8. The method according to claim 1, wherein the remote server includes a link to a corporate server having a corporate database, wherein the corporate database has one or more permission entries associated with the identity information and/or the location information for the one or more multimedia applications available on the electronic equipment.

9. The method according to claim 8, wherein the corporate database further includes at least one digital rights entry associated for the one or more multimedia applications available on the electronic equipment.

10. The method according to claim 9, wherein a multimedia content file generated by the one or more multimedia applications initiated by the user includes the at least one digital rights entry embedded in a portion of the multimedia content file.

11. An electronic equipment comprising:
a memory;
an input device for initiating at least one multimedia application housed within the electronic equipment;
a processor that executes an application program within the memory, the application program when executed causing the electronic equipment to: transmit a request to a remote server upon initiation of one or more multimedia applications, wherein the request includes identification information associated with the electronic equipment and location information associated with a current geographic location associated with the electronic equipment, wherein the remote server includes a database having one or more permission entries associated with the identity information and/or the location information for the one or more multimedia applications available on the electronic equipment, wherein the database further includes at least one digital rights entry associated with the one or more multimedia applications available on the electronic equipment,
receive access information from the remote server, wherein the access information is based at least in part on the request transmitted to the remote server and the access information includes location information in which the electronic equipment has limited rights to create and/or distribute multimedia content; and
processing the access information to determine whether the one or more multimedia that initiated the request are accessible based at least in part on the received access information and wherein a multimedia content file generated by the one or more multimedia applications initiated by the user includes the at least one digital rights entry embedded in a portion of the multimedia content file.

12. The electronic equipment according to claim 11, wherein the multimedia application is photographic equipment housed within the electronic equipment for taking a picture and/or a video.

13. The electronic equipment according to claim 11, wherein the multimedia application is an audio recorder housed within the electronic equipment for recording audio.

14. The electronic equipment according to claim 11, wherein the identification information is an international mobile equipment identity associated with the electronic equipment.

15. The electronic equipment according to claim 14, wherein the location information is based on one or more signals received from a global positioning system.

16. The electronic equipment according to claim 11, wherein if the access information includes an indication that access to the application is prohibited, a signal is transmitted to the processor to terminate the application.

17. A method for limiting the use of one or more multimedia applications of an electronic equipment, the method comprising:
receiving a request upon initiation of a multimedia application from an electronic equipment, wherein the request includes identification information associated with the electronic equipment and current location information associated with a geographic location of the electronic equipment, wherein the remote server includes a database having one or more permission entries associated with the identity information and/or the location information for the one or more multimedia applications available on the electronic equipment, wherein the database further includes at least one digital rights entry associated with the one or more multimedia applications available on the electronic equipment,
querying a database stored remotely from the electronic equipment based at least in part on the request to determine a user's access rights for the multimedia application, wherein the database includes location information in which the electronic equipment has limited rights to create and/or distribute multimedia content; and
transmitting access information to the electronic equipment based at least in part on the location information stored in the database and wherein a multimedia content file generated by the one or more multimedia applications initiated by the user includes the at least one digital rights entry embedded in a portion of the multimedia content file.

18. A non-transitory computer program stored on a machine readable medium, the program being suitable for use in an electronic equipment as a privacy rights manager, wherein:
when the program is loaded in memory in the electronic equipment and executed causes the electronic equipment to transmit a request upon initiation of a multimedia application to a remote server, wherein the request includes identification information associated with the electronic equipment and location information associated with a current location associated with the electronic equipment, wherein the remote server includes a database having one or more permission entries associated with the identity information and/or the location information for the one or more multimedia applications available on the electronic equipment, wherein the database further includes at least one digital rights entry associated with the one or more multimedia applications available on the electronic equipment, receive access information from the remote server, wherein the access information is based at least in part on the request transmitted to the remote server and the access information includes location information in which the electronic equipment has limited rights to create and/or distribute multimedia content; and processing the access information to determine whether the multimedia application is accessible based at least in part on the access information received from the remote server and wherein a multimedia content file generated by the one or more multimedia applications initiated by the user includes the at least one digital rights entry embedded in a portion of the multimedia content file.

* * * * *